(12) United States Patent
Mohammed et al.

(10) Patent No.: US 12,047,711 B2
(45) Date of Patent: Jul. 23, 2024

(54) VEHICLE SURVEILLANCE SYSTEM

(71) Applicant: GM Global Technology Operations LLC, Detroit, MI (US)

(72) Inventors: Abbas Mohammed, Whitby (CA); Joseph F. Szczerba, Grand Blanc, MI (US); Dhruv Patel, Oshawa (CA); Fahim Javid, Pickering (CA); Sai Vishnu Aluru, Commerce, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 211 days.

(21) Appl. No.: 17/818,829

(22) Filed: Aug. 10, 2022

(65) Prior Publication Data
US 2024/0056554 A1   Feb. 15, 2024

(51) Int. Cl.
| | |
|---|---|
| *H04N 7/18* | (2006.01) |
| *B60W 50/14* | (2020.01) |
| *B60W 50/16* | (2020.01) |
| *B60W 60/00* | (2020.01) |
| *G06V 20/52* | (2022.01) |
| *G06V 20/56* | (2022.01) |
| *G08B 25/00* | (2006.01) |
| *H04N 17/00* | (2006.01) |

(52) U.S. Cl.
CPC ............ *H04N 7/181* (2013.01); *B60W 50/16* (2013.01); *B60W 60/001* (2020.02); *G06V 20/52* (2022.01); *G06V 20/56* (2022.01); *H04N 17/002* (2013.01); *B60W 2050/146* (2013.01); *G08B 25/00* (2013.01)

(58) Field of Classification Search
CPC ... H04N 7/181; H04N 17/002; B60W 60/001; B60W 2050/146; G06V 20/52; G06V 20/56; G08B 25/00; G08B 13/19613; G08B 13/19647
USPC ........................................................ 348/148
See application file for complete search history.

(56) References Cited

U.S. PATENT DOCUMENTS

| 11,200,435 B1* | 12/2021 | Scanlon ............... G05D 1/0094 |
| 2019/0039608 A1* | 2/2019 | Song ....................... B60Q 9/008 |

\* cited by examiner

*Primary Examiner* — Christopher S Kelley
*Assistant Examiner* — Asmamaw G Tarko
(74) *Attorney, Agent, or Firm* — Vivacqua Crane, PLLC

(57) ABSTRACT

A method for surveilling with a vehicle includes receiving an area-of-interest data from a vehicle user. The area-of-interest data delineates a virtual fence around the vehicle. The virtual fence is boundary of an area of interest around the vehicle. The vehicle is parked adjacent to an infrastructure. The method further includes receiving sensor data from a sensor of the vehicle that is monitoring the area of interest. Further, the method includes detecting a predetermined activity by a predetermined object of interest within the area of interest based on the sensor data received from the sensor of the vehicle. Also, the method includes notifying the vehicle user of the predetermined activity sensed using the sensor of the vehicle.

16 Claims, 3 Drawing Sheets

VEHICLE SURVEILLANCE SYSTEM

INTRODUCTION

The present disclosure relates to a system and method for surveillance. Specifically, the present disclosure relates to a vehicle surveillance system and method.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicle usually include sensors to monitor the environment external to the vehicle. These sensors typically provide data relevant to the vehicle driving conditions. However, vehicle sensors, such as cameras, may also be used to monitor areas around the vehicle. It is therefore desirable to develop a method and system to monitor areas around a parked vehicle.

SUMMARY

The present disclosure describes a vehicle surveillance system that uses exterior vehicle cameras to monitor any major or minor hazards including on demand security video surveillance based on a vehicle user's consent. The vehicle user interface allows the vehicle users to select specific cameras to monitor specific zones, and the vehicle surveillance system is capable of connecting with a home monitoring system. The vehicle surveillance system may also establish a virtual fence. As such, the vehicle surveillance system is configured to monitor an area of interest as specified by the vehicle user in a specific time intervals. The vehicle surveillance system also allows vehicles with autonomous driving capabilities to self-position to monitor the specific area specified by the vehicle user.

The present disclosure describes a method for surveilling with a vehicle. In an aspect of the present disclosure, the method includes receiving an area-of-interest data from a vehicle user. The area-of-interest data delineates a virtual fence around the vehicle. The virtual fence is boundary of an area of interest around the vehicle. The vehicle is parked adjacent to an infrastructure. The method further includes receiving sensor data from a sensor of the vehicle that is monitoring the area of interest. Also, the method includes detecting a predetermined activity by a predetermined object of interest within the area of interest based on the sensor data received from the sensor of the vehicle. In addition, the method includes notifying the vehicle user of the predetermined activity sensed using the sensor of the vehicle.

In an aspect of the present disclosure, the sensor is a camera. The method further includes determining whether the camera of the vehicle is positioned to capture images of an entirety of the area of interest.

In an aspect of the present disclosure, the method further includes autonomously moving the vehicle to a location where the camera is able to capture the images of the entirety of the area of interest in response to determining that the camera of the vehicle is not positioned to capture images of the entirety of the area of interest.

In an aspect of the present disclosure, the method further includes receiving object data from a law enforcement server. The object data includes information about the predetermined object of interest. Further, the method includes monitoring the area of interest to identify the predetermined object of interest in the area of interest using the camera.

In an aspect of the present disclosure, the method includes identifying the predetermined object of interest in the area of interest using the object data and the sensor data.

In an aspect of the present disclosure, the method includes notifying the law enforcement server that the predetermined object of interest has been identified in the area of interest monitored by the camera of the vehicle in response to identifying the predetermined object of interest in the area of interest using the object data and the sensor data.

In an aspect of the present disclosure, the method includes autonomously moving the vehicle to follow the predetermined object that has been identified in the area of interest in response to identifying the predetermined object of interest in the area of interest using the object data and the sensor data.

In an aspect of the present disclosure, the predetermined activity includes a human moving within the area of interest.

In an aspect of the present disclosure, the infrastructure includes an infrastructure surveillance system. The sensor may be a vehicle camera. The infrastructure surveillance system includes an infrastructure controller and a plurality of infrastructure cameras in communication with the infrastructure controller. The method further includes receiving monitored-location data from the infrastructure controller. The monitored-location data includes information about a coverage area around the infrastructure collectively covered by the plurality of infrastructure cameras. Also, the method includes identifying at least one blind zone of the infrastructure surveillance system based on the monitored-location data. The blind zone of the infrastructure surveillance system is a zone around to the infrastructure that is not collectively covered by the plurality of infrastructure cameras. The method further includes autonomously moving the vehicle to a location where the vehicle camera is able to capture images of the blind zone of the infrastructure surveillance system in response to identifying the blind zone of the infrastructure surveillance system.

In an aspect of the present disclosure, the infrastructure includes an infrastructure surveillance system. The sensor may be a vehicle camera. The infrastructure surveillance system includes an infrastructure controller and a plurality of infrastructure cameras in communication with the infrastructure controller. The method further includes receiving camera activity data from the infrastructure controller. The camera activity data includes information about whether at least one of the plurality of infrastructure cameras is faulty. Also, the method includes determining that least one of the plurality of infrastructure cameras is faulty. The infrastructure camera that is faulty may be referred to as the faulty camera. The method further includes autonomously moving the vehicle to a location where the vehicle camera is able to capture images that would otherwise be captured by the faulty camera in response to determining that least one of the plurality of infrastructure cameras is faulty.

The present disclosure also describes a vehicle. In an aspect of the present disclosure, the vehicle includes a vehicle controller and a plurality of sensors in communication with the vehicle controller. The vehicle controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
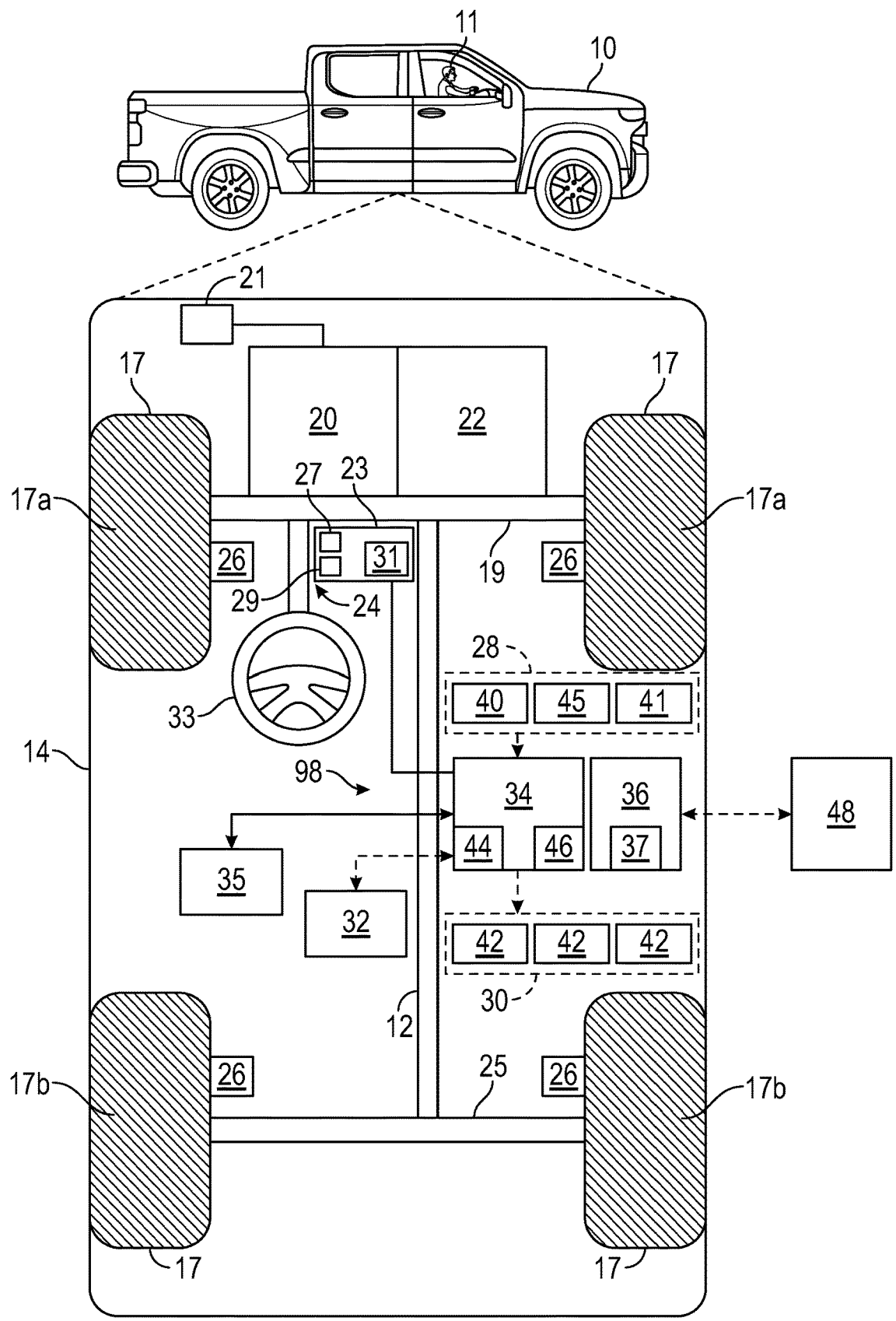
FIG. 1 is a block diagram depicting a vehicle.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a chassis 12, a body 14, front and rear wheels 17 and may be referred to as a vehicle system. In the depicted embodiment, the vehicle 10 includes two front wheels 17a and two rear wheels 17b. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17a and a rear axle 25 coupled to the rear wheels 17b.

In various embodiments, the vehicle 10 may be an autonomous vehicle and a vehicle surveillance system 98 is incorporated into the vehicle 10. The vehicle 10 is, for example, a vehicle that is automatically controlled to carry passengers from one location to another. The vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle user 11 is only expected to be responsible for the DDT-fallback when the vehicle 10 essentially "asks" the driver to take over if something goes wrong or the vehicle is about to leave the zone where it is able to operate. The vehicle user may be a driver, a passenger, a human inside the vehicle 10 and/or a human outside the vehicle 11 that is in wireless communication with the vehicle 10 through an electronic device, such as a smart phone. In Level 2 vehicles, systems provide steering, brake/acceleration support, lane centering, and adaptive cruise control. However, even if these systems are activated, the vehicle user 11 at the wheel must be driving and constantly supervising the automated features.

As shown, the vehicle 10 generally includes a propulsion system 20, a transmission system 22, a steering system 24, a brake system 26, a sensor system 28, an actuator system 30, at least one data storage device 32, at least one vehicle controller 34, and a communication system 36. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the vehicle controller 34 and may include, but are not limited to, one or more radars, one or more light detection and ranging (lidar) sensors, one or more proximity sensors, one or more odometers, one or more ground penetrating radar (GPR) sensors, one or more steering angle sensors, one or more global positioning systems (GPS) transceivers 45, one or more tire pressure sensors, one or more vehicle cameras 41 (e.g., optical cameras and/or infrared cameras), one or more gyroscopes, one or more accelerometers, one or more inclinometers, one or more speed sensors, one or more ultrasonic sensors, one or more inertial measurement units (IMUs) and/or other sensors. Each sensor 40 is configured to generate a signal that is indicative of the sensed observable conditions of the exterior environment and/or the interior environment of the vehicle 10. Because the sensor system 28 provides data to the vehicle controller 34, the sensor system 28 and its sensors 40 are considered sources of information (or simply sources).

The sensor system 28 includes one or more Global Navigation Satellite System (GNSS) transceivers 45 (e.g., Global Positioning System (GPS) transceivers) configured to detect and monitor the route data (i.e., route information). The GNSS transceiver 45 is configured to communicate with a GNSS to locate the position of the vehicle 10 in the globe. The GNSS transceiver 45 is in electronic communication with the vehicle controller 34.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the vehicle controller 34, separate from the vehicle controller 34, or part of the vehicle controller 34 and part of a separate system.

The vehicle 10 may further include one or more airbags 35 in communication with the vehicle controller 34 or another controller of the vehicle 10. The airbag 35 includes an inflatable bladder and is configured to transition between a stowed configuration and a deployed configuration to cushion the effects of an external force applied to the vehicle 10. The sensors 40 may include an airbag sensor, such as an IMU, configured to detect an external force and generate a signal indicative of the magnitude of such external force. The vehicle controller 34 is configured to command the airbag 35 to deploy based on the signal from one or more sensors 40, such as the airbag sensor. Accordingly, the vehicle controller 34 is configured to determine when the airbag 35 has been deployed.

The vehicle controller 34 includes at least one vehicle processor 44 and a vehicle non-transitory computer readable storage device or media 46. The vehicle processor 44 may be a custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the vehicle 10. The vehicle controller 34 may programmed to execute a method 300 (FIG. 4) as described in detail below.

The instructions may include one or more separate programs, each of which comprises an ordered listing of executable instructions for implementing logical functions. The instructions, when executed by the vehicle processor 44, receive and process signals from the sensor system 28, perform logic, calculations, methods, and/or algorithms for automatically controlling the components of the vehicle 10, and generate control signals to the actuator system 30 to automatically control the components of the vehicle 10 based on the logic, calculations, methods, and/or algorithms. Although a single vehicle controller 34 is shown in FIG. 1, embodiments of the vehicle 10 may include a plurality of vehicle controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the vehicle controller 34 are embodied in the vehicle surveillance system 98. The vehicle 10 includes a vehicle user interface 23, which may be a touchscreen in the dashboard. The vehicle user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the vehicle 10. The vehicle user interface 23 is in electronic communication with the vehicle controller 34 and is configured to receive inputs by a vehicle user (e.g., a vehicle user or a vehicle passenger). For example, the vehicle user interface 23 may include a touch screen and/or buttons configured to receive inputs from a vehicle user 11. Accordingly, the vehicle controller 34 is configured to receive inputs from the vehicle user 11 via the vehicle user interface 23.

The communication system 36 is in communication with the vehicle controller 34 and is configured to wirelessly communicate information to and from other remote entities 48, such as but not limited to, other vehicles ("V2V" communication), infrastructure 100 (FIG. 2) ("V2I" communication), remote systems at a remote call center (e.g., ON-STAR by GENERAL MOTORS, a law enforcement surveillance system 200 (FIG. 2)) and/or personal electronic devices, such as a smart phone. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or vehicle communication transceivers 37 for receiving and/or transmitting signals, such as cooperative sensing messages (CSMs). The vehicle communication transceivers 37 may be considered sensors 40. The communication system 36 is configured to wirelessly communicate information between the vehicle 10 and another vehicle. Further, the communication system 36 is configured to wirelessly communicate information between the vehicle 10 and infrastructure or other vehicles.

Figure 2:
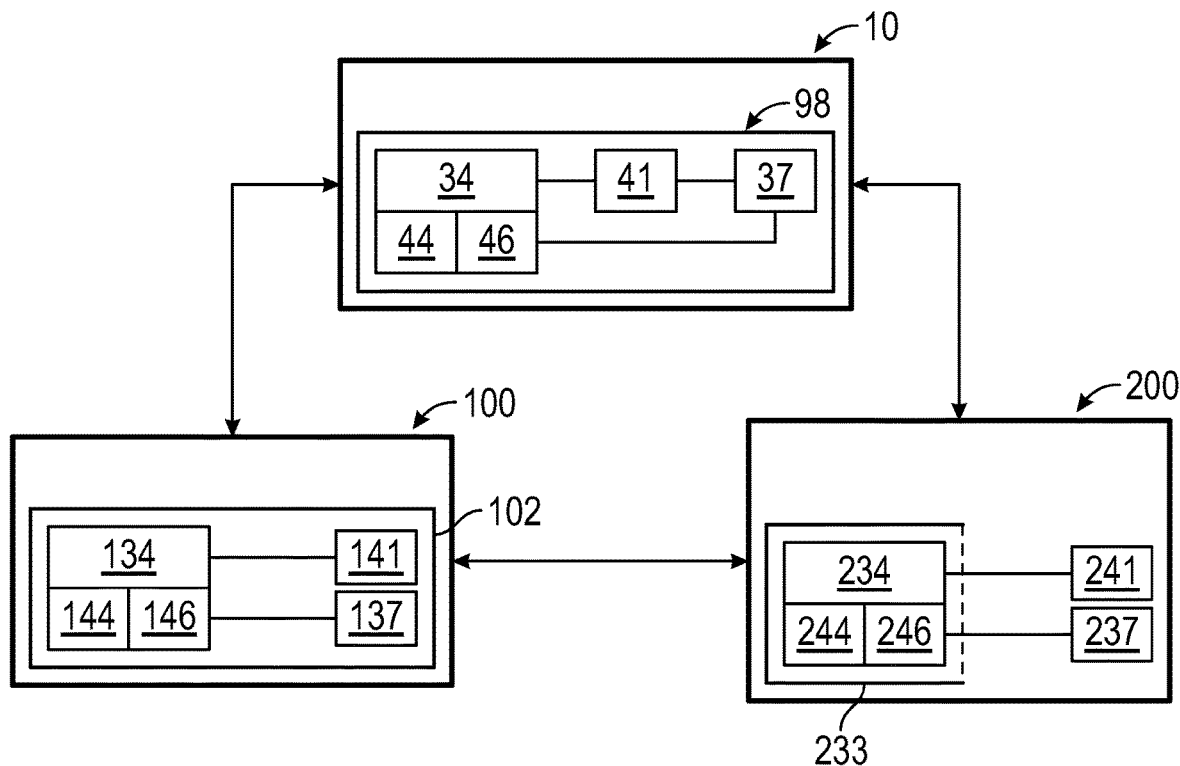
FIG. 2 is a block diagram of the vehicle of FIG. 1, an infrastructure surveillance system, the vehicle of FIG. 1, and a law enforcement surveillance system in communication with one another.

With reference to FIGS. 1 and 2, the vehicle 10 is in communication (e.g., wireless communication) with an infrastructure 100, such as a home, and a law enforcement surveillance system 200. The law enforcement surveillance system 200 is not necessarily controlled or operated by a public law enforcement agency. Rather, the law enforcement surveillance system 200 may be operated by another public entity or even a private entity. As discussed above, the vehicle 10 includes at least one vehicle controller 34, one or more vehicle cameras 41, one or more vehicle communication transceivers 37. The vehicle controller 34 is in communication with the vehicle cameras 41 and the vehicle communication transceivers 37. Using the vehicle communication transceivers 37, the vehicle 10 can wirelessly communicate with the infrastructure 100, such as a house or a commercial building, and the law enforcement surveillance system 200.

Figure 3:
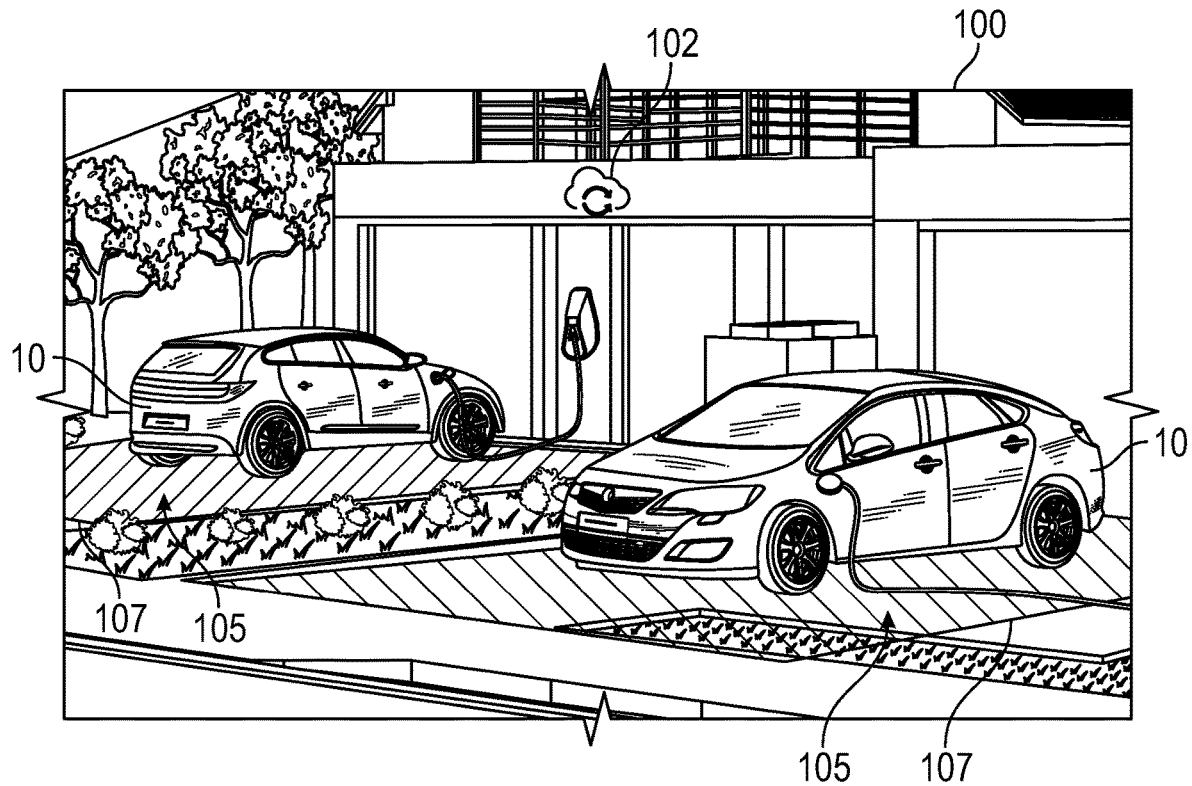
FIG. 3 is a schematic perspective view of one or more vehicles as shown in FIG. 1 and an infrastructure including the infrastructure surveillance system of FIG. 2.

With continued refence to FIGS. 2 and 3, the infrastructure 100 includes an infrastructure surveillance system 102 configured to survey and monitor the area nearby the infrastructure 100. The infrastructure surveillance system 102 includes an infrastructure communication transceiver 137 for receiving and/or transmitting signals. The infrastructure communication transceivers 137 are configured to wirelessly communicate data between the vehicle 10 and infrastructure 100 and/or the infrastructure 100 and the law enforcement surveillance system 200.

The infrastructure 100 further includes one or more infrastructure cameras 141 configured to capture images around the infrastructure 100, at least one infrastructure controller 134 in communication with the infrastructure cameras 141, and the infrastructure communication transceivers 137. The vehicle 10 may be parked (i.e., stationary) adjacent to the infrastructure 100 to monitor a zone adjacent to the infrastructure 100. The infrastructure controller 134 includes at least one infrastructure processor 144 and an infrastructure non-transitory computer readable storage device or media 146. The infrastructure processor 144 may be a custom made or commercially available processor, a central processing unit (CPU), a graphics processing unit (GPU), an auxiliary processor among several processors associated with the infrastructure controller 134, a semiconductor-based microprocessor (in the form of a microchip or chip set), a macroprocessor, a combination thereof, or generally a device for executing instructions. The infrastructure computer readable storage device or media 146 may include volatile and nonvolatile storage in read-only memory (ROM), random-access memory (RAM), and keep-alive memory (KAM), for example. KAM is a persistent or non-volatile memory that may be used to store various operating variables while the infrastructure processor 144 is powered down. The infrastructure computer-readable storage device or media 146 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the infrastructure controller 134 in controlling the infrastructure 100. The infrastructure controller 134 may programmed to execute part or the entirety of the method 300 (FIG. 4) as described in detail below.

The law enforcement surveillance system 200 is configured to survey and monitor the area nearby the infrastructure 100 and/or the vehicle 10 and includes a law enforcement communication transceiver 237 for receiving and/or transmitting signals. The law enforcement communication transceivers 237 are configured to wirelessly communicate information between the vehicle 10 and law enforcement surveillance system 200 and/or the infrastructure 100 and the law enforcement surveillance system 200. Further, the law enforcement surveillance system 200 includes one or more law enforcement cameras 241 configured to capture images around the infrastructure 100 and/or the vehicles 10 and at least one law enforcement controller 234 in communication with the law enforcement cameras 241 and the law enforcement communication transceivers 237. The law enforcement controller 234 includes at least one law enforcement processor 244 and a law enforcement non-transitory computer readable storage device or media 246. The law enforcement processor 244 may be a custom made or commercially available processor, a central processing unit (CPU), a graphics processing unit (GPU), an auxiliary processor among several processors associated with the law enforcement controller 234, a semiconductor-based microprocessor (in the form of a microchip or chip set), a macroprocessor, a combination thereof, or generally a device for executing instructions. The law enforcement computer readable storage device or media 246 may include volatile and nonvolatile storage in read-only memory (ROM), random-access memory (RAM), and keep-alive memory (KAM), for example. KAM is a persistent or non-volatile memory that may be used to store various operating variables while the law enforcement processor 244 is powered down. The law enforcement computer-readable storage device or media 246 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the law enforcement controller 234 in controlling the law enforcement surveillance system 200. The law enforcement controller 234 may programmed to execute part or the entirety of the method 300 (FIG. 4) as described in detail below. The law enforcement controller 234 may be part of a law enforcement server 233.

With continued reference to FIGS. 2 and 3, the vehicle surveillance system 98 uses exterior cameras (e.g., vehicle cameras 41) to monitor any major or minor hazards including on demand security video surveillance based on the vehicle user's consent. The vehicle user interface 23 allows the vehicle users 11 to select specific camera (and therefore select the direction of monitoring of the vehicle cameras 41) to offer specific zone monitoring with the ability to connect with infrastructure surveillance system 102. The vehicle 10 is also capable to establish one or more virtual fences 107 around the vehicle 10. The virtual fence 107 may be enclosed and defines a boundary of an area of interest 105 around the vehicle 10. As a result, the vehicle surveillance system monitors vehicle user's specified area around the vehicle 10 (i.e., area of interest 105) in each time bound. In other words, the vehicle surveillance system 98 allows the vehicle user to select any outside area in the vehicle proximity (from several external camera hardware input) to specify zones of monitoring (virtual fencing). It is envisioned that the area of interest may be an area that is within a predetermined distance (e.g., one meter) from the vehicle 10 and that surrounds the entire perimeter of the vehicle 10. In addition, the vehicle surveillance system 98 allows the vehicle user 11 to customize the type of monitoring (alert on people walking too closely/other vehicle getting too close while backing up on driveway for example). As another example, the vehicle surveillance system 98 may alert the vehicle user 11 that a pedestrian is within the area of interest 105 in a preselected time window. Based on the zone of monitoring (i.e., area of interest 105) selected by the vehicle user 11, the vehicle surveillance system 98 determines which sensors 40 (e.g., vehicle cameras 41, radars, lidars, etc.) should be enabled to monitor the area of interest 105. The vehicle surveillance system 98 allows the vehicle user 11 which sensors 40 (e.g., vehicle cameras 41) will be used to monitor the area of interest 105. For example, the vehicle user 11 may select all the vehicle cameras 41 or only some vehicle cameras 41. Selecting some (but not all of the sensors 40) for monitoring the area of interest 105 may help reduce the electrical load and conserve battery energy. If the vehicle 10 is autonomous, the vehicle surveillance system 98 also provides the vehicles 10 with self-positioning capabilities to provide repetitive specific area/zone surveillance.

With continued reference to FIGS. 2 and 3, the vehicle surveillance system 98 may enable the vehicle 10 to identify, locate, and report events based on input from a connected law enforcement server 233 by utilizing on-board exterior cameras (i.e., vehicle cameras 41), GNSS transceivers 45 (e.g., GPS transceivers), and/or other sensors 40. A software as service feature that connects the law enforcement server 233 to fleet vehicles 10 in a given area that provides surveillance feedback for a targeted vehicle. V2X communications and the law enforcement server 233 allow the vehicle surveillance system 98 to send an alert, such as an AMBER alert, directly to all remote vehicles in a region, thereby enabling these remote vehicles to monitor (vehicle plate, type, color) and report (if the vehicle operator allows) back images and/or the location of the suspect vehicle to the law enforcement server 233. The vehicle user 11 may also approve the autonomous vehicle 10 to be sent out to the local area of police interest to provide additional surveillance services for law enforcement authorities. This surveillance may be configured as a software as a service feature and may only be enabled with the vehicle user's consent. This software as a service feature may be enabled by the vehicle user 11 via phone app or the vehicle user interface 23 (i.e., the human-machine interface of the vehicle 10) with the ability to select specific operational time, sensors selections, surrounding monitoring area selection, etc.

Figure 4:
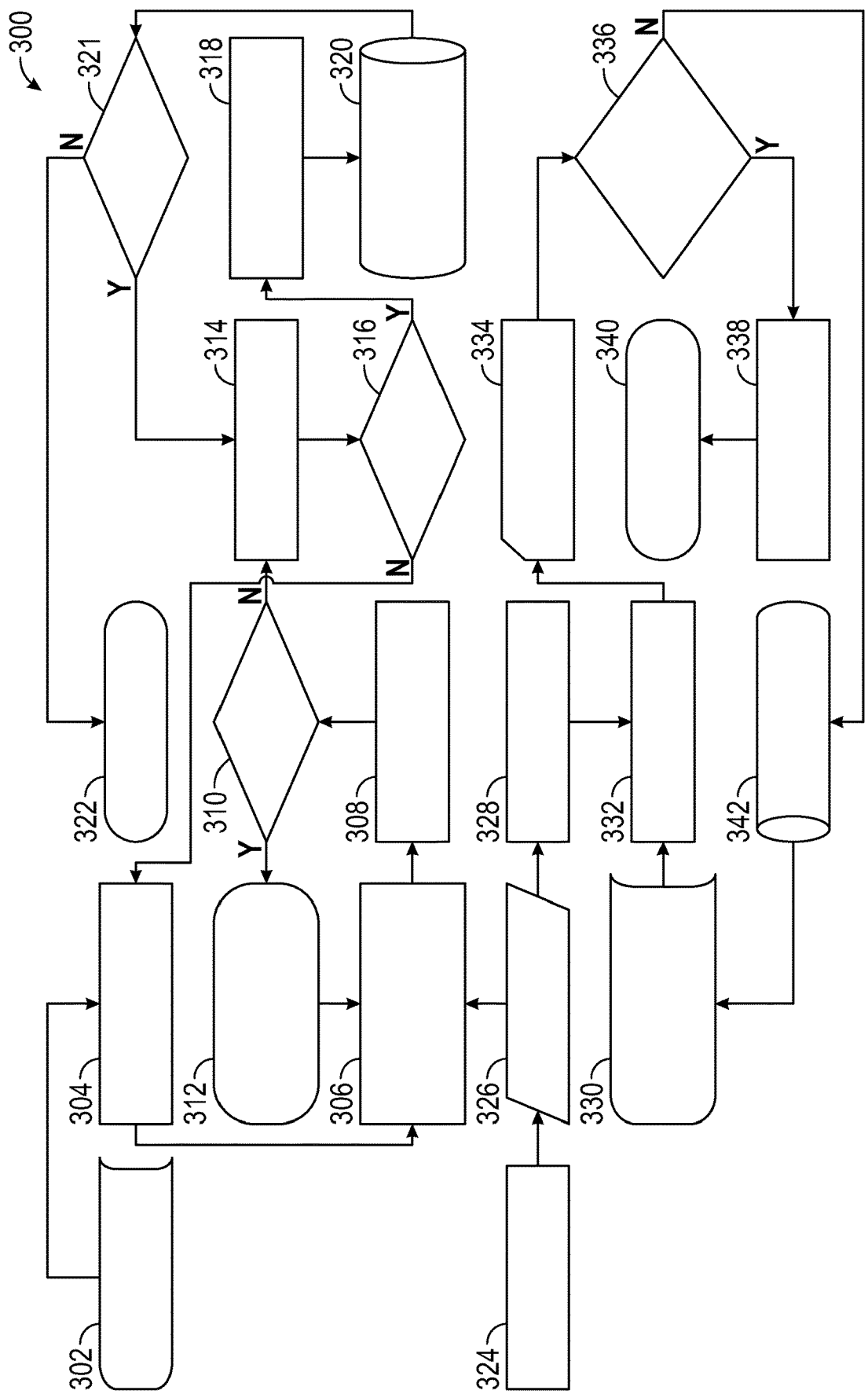
FIG. 4 is a flowchart of a method for surveillance using the vehicle of FIG. 1.

FIG. 4 is a flowchart of a method 300 for surveilling with the vehicle 10. The method 300 begins at block 302. At block 302, the vehicle controller 34 receives an input from the vehicle user 11 through the user interface 23 or a computer app. The input includes area-of-interest data. The area-of-interest data delineates the virtual fence 107 inputted by the vehicle user 11. Accordingly, the virtual fence 107 is the boundary of the area of interest around the vehicle 10 that the vehicle operator wishes to monitor. At block 302, the area-of-interest data may be stored on the vehicle non-transitory computer readable storage device or media 46. The input by the vehicle user 11 may also data about which sensors 40 (e.g., vehicle cameras 41) will be used to monitor the area of interest 105. Then, the method 300 continues to block 302.

At block 304, the vehicle controller 34 commands all or some of the sensors 40 to monitor the area of interest 105 as selected by the vehicle user 11. As discussed above, depending on the input by the vehicle user 11, all or some of the sensors 40 (e.g., vehicle cameras 41) may be used to monitor the area of interest 105. If the vehicle user 11 does not select specific sensors 40 to use, then the vehicle controller 34 commands all of the sensors 40 (e.g., all of the vehicle cameras 41) to monitor the area of interest 105 around the vehicle 10. Each of the sensors 40 is in communication with the vehicle controller 34. Accordingly, the vehicle controller 34 is programmed to receive sensor data from the sensors 40. The sensor data include information sensed by the sensors 40, such as captured images.

Also, at block 304, the vehicle controller 34 determines whether the sensors 40 of the vehicle 10 are positioned to monitor the area of interest 105 as inputted by the vehicle user 11. As a non-limiting example, the vehicle controller 34 determines whether the vehicle cameras 41 of the vehicle 10 are positioned to capture images of the entire area of interest 105 as selected by the vehicle user 11. If the sensors 40 are able to monitor the entire area of interest 105, then the vehicle controller 34 refrains from commanding the vehicle 10 to move autonomously. For example, if the vehicle cameras 41 are able to capture images of the entire area of interest 105, then the vehicle controller 34 refrains from commanding the vehicle 10 to move autonomously. If the sensors 40 are not able to monitor the entire area of interest 105, then the vehicle controller 34 commands the vehicle 10 to move autonomously to a location where the sensors 40 are able to monitor entire area of interest 105. For example, if the vehicle cameras 41 are able to capture images of the entire area of interest 105, then the vehicle controller 34 commands the vehicle 10 to move to a location where the vehicle cameras 41 are able to capture images of the entire area of interest 105.

Also, at block 304, the area of interest 105 may referred to an area around the vehicle 10. However, it is contemplated that the area of interest 105 may refer to an area around the infrastructure 100 (e.g., house). In this case, the vehicle 10 may be parked (i.e., stationary) at a location (e.g., driveway) adjacent to the infrastructure 100. Using the user interface 23, the vehicle user 11 may select whether the area of interest 105 is an area around the vehicle 10 or an area around the infrastructure 100. Such selection is communicated from the user interface 23 to the vehicle controller 34. If the area of interest 105 is an area around the infrastructure 100, the vehicle controller 34 may identify one or more blind zones of the infrastructure surveillance system 102. The term "blind zone" means a zone around to the infrastructure 100 is not collectively covered by the infrastructure cameras 141 (i.e., the uncovered area). Thus, for some reason, the infrastructure cameras 141 cannot capture images of the blind zones of the infrastructure surveillance system 102. To identify the blind zones of the infrastructure surveillance system 102, the vehicle controller 34 first receives monitored-location data from the infrastructure controller 134. The monitored-location data includes information about the coverage area around the infrastructure 100 collectively covered by the infrastructure cameras 141. That is, the monitored-location data includes information about the location of the zones monitored by the infrastructure cameras 141. Thus, the infrastructure cameras 141 are positioned to capture images of the coverage area around the infrastructure. If the vehicle controller 34 identifies one or more blind zones, then the vehicle controller 34 commands the vehicle 10 to move autonomously to a location where one or more vehicle cameras 41 are able to capture images of the entire blind zone or blind zones.

Also, at block 304, the vehicle controller 34 may receive camera activity data from the infrastructure controller 134. The camera activity data includes information about whether one or more infrastructure camera 141 is faulty or inactive. Using the camera activity data from the infrastructure controller 134, the vehicle controller 34 may determine whether one or more infrastructure cameras 141 is faulty or inactive. The zone previously monitored by the faulty or inactive infrastructure camera 141 may also be referred to as a blind zone of the infrastructure surveillance system 102. If one or more infrastructure cameras 141 is faulty or inactive, then the vehicle controller 34 commands the vehicle 10 to move autonomously to a location where one or more vehicle cameras 41 are able to capture images of the entire blind zone. In other words, if one or more infrastructure cameras 141 is faulty or inactive, then the vehicle controller 34 commands the vehicle 10 to move autonomously to a location where one or more vehicle cameras 41 are able to capture images of that would otherwise be captured by the faulty or inactive infrastructure camera 141 (i.e., the faulty camera). After executing block 304, the method 300 proceeds to block 306.

At block 306, the vehicle controller 34 monitors statistics about the vehicle cameras 41, such the camera peak signal-to-noise ratio (PSNR) statistics and histogram statistics. Then, the method 300 continues to block 308.

At block 308, the vehicle controller 34 compares the PSNR of one or more vehicle cameras 41 with a calibratable, predetermined PSNR threshold. The method 300 then proceeds to block 310.

At block 310, the vehicle controller 34 determines whether the PSNR of one or more vehicle cameras 41 is less than the calibratable, predetermined PSNR threshold. If the PSNR of one or more vehicle cameras 41 is less than the calibratable, predetermined PSNR threshold, then the method 300 proceeds to block 312.

At block 312, the vehicle controller 34 ignores the vehicle cameras 41 with the PSNR below the calibratable, predetermined PSNR threshold for a predetermined number of frames (e.g., 10 frames). Next, the method 300 returns to block 306. If the PSNR of one or more vehicle cameras 41 is equal to or greater than the calibratable, predetermined PSNR threshold, then the method 300 proceeds to block 314.

At block 314, the vehicle controller 34 executes an object recognition process using the images captured by the vehicle cameras 41. In other words, at block 314, the vehicle controller 34 processes the images captured by the vehicle cameras 41 or other sensor data from the sensors 40 to determine whether a predetermined object of interest (e.g., a human) is within the area of interest 105 as selected by the vehicle user 11. Then, the method 300 continues to block 316.

At block 316, the vehicle controller 34 uses the sensor data (e.g., the images captured by the vehicle cameras 41) to detect whether the predetermined object of interest (e.g., a human) is within the area of interest 105. If no predetermined object of interest has been detected within the area of interest 105, the method 300 returns to block 304. If one or more predetermined objects of interest have been detected within the area of interest 105, the method 300 continues to block 318.

At block 318, the vehicle controller 34 categorizes the predetermined object of interest detected within the area of interest 105. For example, the vehicle 34 may determine whether the predetermined object of interest detected within the area of interest 105 is a pedestrian, an animal, a car, among other things. Then, the method 300 proceeds to block 320.

At block 320, the vehicle controller 34 trains a neural network to distinguish between usual activities and unusual activities. The term "usual activity" means an activity detected by the sensors 40 (e.g., vehicle cameras 41) inside the area of interest 105 that the do not warrant a notification to the vehicle user 11, whereas the term "unusual activity" an activity detected by the sensors 40 (e.g., vehicle cameras 41) inside the area of interest 105 that warrants a notification to the vehicle user 11. The unusual activity may be referred to as a predetermined activity. This neural network training may be based on time, type of activity, and object category. For example, the vehicle surveillance system 98 may classify a garbage truck stopping every Thursday between 10:00 am and 11:00 am as a usual activity. Any activity detected inside the area of interest 105 that is not classified as a usual activity is by default classified as an unusual activity. For example, a human walking inside the area of interest 105 may be classify as an unusual activity. The vehicle controller 34 may be programmed with face recognition software to distinguish between different people and, therefore, the neural network may be trained to classify the presence of humans inside the area of interest 105 (other than previously identified people associated with the infrastructure 100, such as home residents) as an unusual activity. Then, the method 300 proceeds to block 321.

At block 321, the vehicle controller 34 determines whether the activity detected by the sensors 40 (e.g., vehicle cameras 41) inside the area of interest 105 is a usual activity or an unusual activity using the previously trained neural network. If the activity detected by the sensors 40 (e.g., vehicle cameras 41) inside the area of interest 105 is a usual activity, then the method 300 returns to block 314. If the activity detected by the sensors 40 (e.g., vehicle cameras 41) inside the area of interest 105 is an unusual activity, then the method 300 proceeds to block 322.

At block 322, the vehicle controller 34 notifies the vehicle user 11 that the unusual activity by predetermined object of interest (e.g., a human walking within the area of interest 105) has been detected by one or more of the sensors 40 (e.g., vehicle camera 41). To do so, the vehicle controller 34 may command the user interface 23 and/or the remote entity 48 (e.g., a smart phone through an app or a desktop computer) to issue a visual and/or audible alert. The alert may also include a preview of the video of the unusual activity captured by the vehicle camera 41. As discussed above, the usual activity may be referred to as the predetermined activity (e.g., walking) by a predetermined object of interest (e.g., human) at the predetermined time (e.g., hours between 9:00 am and 6:00 pm) inside the area of interest 105.

With continued reference to FIG. 4, the method 300 also includes actions for law enforcement purposes and such actions begin at block 324. At block 324, the sensors 40 of the vehicle 10 collect sensor data. For example, the vehicle cameras 41 may capture live images of the area of interest 105. These live images include frames. The sensor data (e.g., images) from the sensors 40 (e.g., vehicle cameras 41) are then sent to the vehicle controller 34 and/or the law enforcement server 233. The sensor data may be sent wirelessly to the law enforcement server 233. Then, the method 300 continues to block 326.

At block 326, the vehicle controller 34 and/or the law enforcement server 233 receive the sensor data from one or more sensors 40 of the vehicle 10. For example, the vehicle controller 34 and/or the law enforcement server 233 receive images captured by one or more vehicle cameras 41. The vehicle cameras 41 may individually or collectively have a 360-degree field of view. Thus, the vehicle controller 34 and/or the law enforcement server 233 acquire frames of the live images captured by the vehicle cameras 41 in the area of interest 105. Then, the method 300 continues to block 306 (as discussed above) and to block 328.

At block 328, the law enforcement server 233 executes an object recognition process using the images captured by the vehicle cameras 41. In other words, at block 328, the law enforcement server 233 processes the images captured by the vehicle cameras 41 or other sensor data from the sensors 40 to determine whether a predetermined object of interest (e.g., a human or a remote vehicle) is within the area of interest 105 as selected by the vehicle user 11. Then, the method 300 continues to block 328.

The method 300 also includes block 330. At block 330, the law enforcement server 233 receives relevant data, which includes logistic data, navigation data, and object data. The object data object data includes information about a predetermined object of interest that law enforcement personnel would like to locate or identify using the vehicle cameras 41. Accordingly, the vehicle controller 34 may also receive the object data, which includes information about the remote vehicle (or another remote entity 48) of interest that the law enforcement personal wishes to locate. For example, the object data may include an alert, such an AMBER alert, which contains information about the license plate, the color, the brand, and the model of the remote vehicle (or another remote entity 48) that may possibly carry a kidnapped victim. In this case, law enforcement personnel want to use the vehicle cameras 41 of the vehicle 10 (with the vehicle user's consent) to locate the remote vehicle that carries the kidnapped victim. In another example, the object data includes facial recognition data of a missing person, and the law enforcement server 233 and/or the vehicle controller 34 are programmed to monitor the area of interest 105 to identify the face of the missing person. After block 330 and block 328, the method 300 proceeds to block 332.

At block 332, the law enforcement server 233 and/or the vehicle controller 34 commands the vehicle cameras 41 (or other sensors 40) to monitor the area of interest 105 to identify the predetermined object of interest (e.g., a remote vehicle carrying a kidnapped child) using the object data. The vehicle cameras 41 scan the area of interest 105 to identify the predetermined object of interest for a predetermined amount of time (e.g., two hours). Then, the method 300 continues to block 334.

At block 334, the law enforcement server 233 and/or the vehicle controller 34 compares the time elapsed since the vehicle cameras 41 started monitoring the area of interest 105 to identify the predetermined object of interest with a predetermined calibratable time threshold. Then, the method 300 continues to block 336.

At block 336, the law enforcement server 233 and/or the vehicle controller 34 determines whether the predetermined object of interest (e.g., the face of the missing person and/or the remote vehicle that carries the kidnapped child) has been identified inside the area of interest 105 within the predetermined, calibratable time threshold using the object data received from the law enforcement personnel and the sensor data (e.g., images) received from the sensors 40 (e.g., vehicle cameras 41) of the vehicle 10. To do so, the law enforcement server 233 and/or the vehicle controller 34 determines whether the time elapsed since the vehicle cameras 41 started monitoring the area of interest 105 to identify the predetermined object of interest is equal to or less than the predetermined calibratable time threshold. If the law enforcement server 233 and/or the vehicle controller 34 has not identified the predetermined object of interest (e.g., the face of the missing person and/or the remote vehicle that carries the kidnapped child) within the predetermined, calibratable time threshold, then the method 300 continues to block 342.

At block 342, the law enforcement server 233 saves a note, indicating that no predetermined object of interest had been identified within the predetermined, calibratable time threshold on a database on recent notification. This database may be the law enforcement non-transitory computer readable storage device or media 246. After executing block 342, the method 300 returns to block 330.

At block 336, if the law enforcement server 233 and/or the vehicle controller 34 identifies the predetermined object of interest (e.g., the face of the missing person and/or the remote vehicle that carries the kidnapped child) within the predetermined, calibratable time threshold, then the method 300 continues to block 338. At block 338, the vehicle controller 34 employs V2X communication to send target data to the the law enforcement server 233. The target data includes information about the predetermined object of interest (i.e., the target object) identified by the vehicle controller 34 using the sensors 40 (e.g., vehicle cameras 41). For example, the target data may include the location the predetermined object of interest based on the sensor data (e.g., data gathered from the GNSS transceiver), date that the predetermined object of interest was identified, and/or the time that the predetermined object of interest was identified. Then, the method 300 proceeds to block 340.

At block 340, the law enforcement server 233 generates an audible and/or visual notification in response to identifying the predetermined object of interest in the area of interest 105. The notification may include the target data (e.g., the location the predetermined object of interest, date that the predetermined object of interest was identified, and/or the time that the predetermined object of interest was identified). Also, at block 340, with the vehicle user's consent, the vehicle controller 34 may command the vehicle 10 to move autonomously to follow the predetermined object of interest (e.g., remote vehicle) that has been identified in the area of interest in response to identifying the predetermined object of interest in the area of interest using the object data and the sensor data.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for surveilling with a vehicle, comprising:
    receiving an area-of-interest data from a vehicle user, wherein the area-of-interest data delineates a virtual fence around the vehicle, the virtual fence is a boundary of an area of interest around the vehicle, and the vehicle is parked adjacent to an infrastructure;
    receiving sensor data from a sensor of the vehicle that is monitoring the area of interest, wherein the sensor is a camera;
    determining whether the camera of the vehicle is positioned to capture images of an entirety of the area of interest;
    autonomously moving the vehicle to a location where the camera is able to capture the images of the entirety of the area of interest in response to determining that the camera of the vehicle is not positioned to capture images of the entirety of the area of interest;
    detecting a predetermined activity by a predetermined object of interest within the area of interest based on the sensor data received from the sensor of the vehicle; and
    notifying the vehicle user of the predetermined activity sensed using the sensor of the vehicle.

2. The method of claim 1, further comprising:
    receiving object data from a law enforcement server, wherein the object data includes information about the predetermined object of interest; and
    monitoring the area of interest to identify the predetermined object of interest in the area of interest using the camera.

3. The method of claim 2, further comprising identifying the predetermined object of interest in the area of interest using the object data and the sensor data.

4. The method of claim 3, further comprising notifying the law enforcement server that the predetermined object of interest has been identified in the area of interest monitored by the camera of the vehicle in response to identifying the predetermined object of interest in the area of interest using the object data and the sensor data.

5. The method of claim 4, further comprising autonomously moving the vehicle to follow the predetermined object of interest that has been identified in the area of interest in response to identifying the predetermined object of interest in the area of interest using the object data and the sensor data.

6. The method of claim 1, wherein the predetermined activity includes a human moving within the area of interest.

7. The method of claim 1, wherein the infrastructure includes an infrastructure surveillance system, the sensor is a vehicle camera, the infrastructure surveillance system includes an infrastructure controller and a plurality of infrastructure cameras, and the method further comprises:
    receiving monitored-location data from the infrastructure controller, wherein the monitored-location data includes information about a coverage area around the infrastructure collectively covered by the plurality of infrastructure cameras;
    identifying at least one blind zone of the infrastructure surveillance system based on the monitored-location data, the at least one blind zone of the infrastructure surveillance system is a zone around to the infrastructure that is not collectively covered by the plurality of infrastructure cameras; and
    autonomously moving the vehicle to a location where the vehicle camera is able to capture images of the at least one blind zone of the infrastructure surveillance system in response to identifying the at least one blind zone of the infrastructure surveillance system.

8. The method of claim 1, wherein the infrastructure includes an infrastructure surveillance system, the sensor is a vehicle camera, the infrastructure surveillance system includes an infrastructure controller and a plurality of infrastructure cameras in communication with the infrastructure controller, and the method further comprises:
    receiving camera activity data from the infrastructure controller, wherein the camera activity data includes information about whether at least one of the plurality of infrastructure cameras is faulty;
    determining that least one of the plurality of infrastructure cameras is faulty, wherein the at least one of the plurality of infrastructure cameras that is faulty is a faulty camera; and
    autonomously moving the vehicle to a location where the vehicle camera is able to capture images that would otherwise be captured by the faulty camera in response to determining that the at least one of the plurality of infrastructure cameras is faulty.

9. A vehicle, comprising:
a vehicle controller;
a plurality of sensors in communication with the vehicle controller, wherein the plurality of sensors is a plurality of vehicle cameras, and the vehicle controller is programmed to:
receive an area-of-interest data from a vehicle user, wherein the area-of-interest data delineates a virtual fence around the vehicle, and the virtual fence is boundary of an area of interest around the vehicle;
receive sensor data from at least one of the plurality of sensors that is monitoring the area of interest, wherein the vehicle is parked adjacent to an infrastructure;
determine whether at least one of the plurality of vehicle cameras is positioned to capture images of the area of interest;
command the vehicle to autonomously move to a location where the at least one of the plurality of vehicle cameras is able to capture the images of the area of interest;
detect a predetermined activity adjacent to the infrastructure based on the sensor data received from at least one of the plurality of sensors; and
notify the vehicle user of the predetermined activity sensed using at least one of the plurality of sensors.

10. The vehicle of claim 9, wherein the vehicle controller is programmed to:
receive object data from a law enforcement server, wherein the object data includes information about a predetermined object of interest; and
monitor the area of interest to identify the predetermined object of interest in the area of interest using the plurality of vehicle cameras.

11. The vehicle of claim 10, wherein the vehicle controller is programmed to identify the predetermined object of interest in the area of interest using the object data and the sensor data.

12. The vehicle of claim 11, wherein the vehicle controller is programmed to notify the law enforcement server that the predetermined object of interest has been identified in the area of interest monitored by the at least one of the vehicle cameras in response to identifying the predetermined object of interest in the area of interest using the object data and the sensor data.

13. The vehicle of claim 12, wherein the vehicle controller is programmed to command the vehicle to autonomously move the vehicle to follow the predetermined object that has been identified in the area of interest in response to identifying the predetermined object of interest in the area of interest using the object data and the sensor data.

14. The vehicle of claim 9, wherein the predetermined activity includes a human moving within the area of interest.

15. The vehicle of claim 9, wherein the infrastructure includes an infrastructure surveillance system, the plurality of sensors is a plurality of vehicle cameras, the infrastructure surveillance system includes an infrastructure controller and a plurality of infrastructure cameras in communication with the infrastructure controller, and the vehicle controller is programmed to:
receive monitored-location data from the infrastructure controller, wherein the monitored-location data includes information about a coverage area around the infrastructure collectively covered by the plurality of infrastructure cameras;
identify at least one blind zone of the infrastructure surveillance system based on the monitored-location data, the at least one blind zone of the infrastructure surveillance system is an uncovered area around the infrastructure that is not collectively covered by the plurality of infrastructure cameras; and
command the vehicle to move autonomously to a location where the vehicle camera is able to capture images of the at least one blind zone of the infrastructure surveillance system in response to identifying the at least one blind zone of the infrastructure surveillance system.

16. The vehicle of claim 9, wherein the infrastructure includes an infrastructure surveillance system, at least one of the plurality of sensors is a vehicle camera, the infrastructure surveillance system includes an infrastructure controller and a plurality of infrastructure cameras in communication with the infrastructure controller, and the vehicle controller is programmed to:
receive camera activity data from the infrastructure controller, wherein the camera activity data includes information about whether at least one of the plurality of infrastructure cameras is faulty;
determine that least one of the plurality of infrastructure cameras is faulty, wherein the at least one of the plurality of infrastructure cameras that is faulty is a faulty camera; and
command the vehicle to autonomously move to a location where the vehicle camera is able to capture images that would otherwise be captured by the faulty camera in response to determining that least one of the plurality of infrastructure cameras is faulty.

* * * * *